United States Patent
Jarrett, Jr. et al.

(10) Patent No.: US 8,668,444 B2
(45) Date of Patent: Mar. 11, 2014

(54) ATTACHMENT STUD FOR A VARIABLE VANE ASSEMBLY OF A TURBINE COMPRESSOR

(75) Inventors: Harry McFarland Jarrett, Jr., Simpsonville, SC (US); Andrew John Lammas, Greenville, SC (US); Michael Christopher Howard, Simpsonville, SC (US)

(73) Assignee: General Electric Company, Schenectady, N.Y.

( * ) Notice: Subject to any disclaimer, the term of this patent is extended or adjusted under 35 U.S.C. 154(b) by 719 days.

(21) Appl. No.: 12/892,301

(22) Filed: Sep. 28, 2010

(65) Prior Publication Data

US 2012/0076658 A1    Mar. 29, 2012

(51) Int. Cl.
*F01D 17/16* (2006.01)
(52) U.S. Cl.
USPC .......................................................... 415/160
(58) Field of Classification Search
USPC .................. 415/148, 151, 159, 160, 161, 162
See application file for complete search history.

(56) References Cited

U.S. PATENT DOCUMENTS

| | | | | |
|---|---|---|---|---|
| 2,842,305 | A | * | 7/1958 | Eckenfels et al. ......... 415/149.4 |
| 3,031,049 | A | * | 4/1962 | Somville ....................... 52/656.6 |
| 3,563,669 | A | * | 2/1971 | Hockert et al. ............... 415/115 |
| 3,736,070 | A | | 5/1973 | Moskowitz et al. |
| 3,788,763 | A | * | 1/1974 | Nickles ......................... 415/147 |
| 3,799,694 | A | | 3/1974 | Duzan |
| 4,050,844 | A | | 9/1977 | Miller et al. |
| 4,193,738 | A | * | 3/1980 | Landis et al. ................. 415/115 |
| 4,295,784 | A | | 10/1981 | Manning |
| 4,443,043 | A | | 4/1984 | Yamaguchi |
| 4,668,165 | A | * | 5/1987 | Ludwick ....................... 415/148 |
| 4,755,104 | A | | 7/1988 | Castro et al. |
| 4,767,264 | A | | 8/1988 | Kisling et al. |
| 4,792,277 | A | * | 12/1988 | Dittberner et al. ............ 415/160 |
| 4,925,364 | A | | 5/1990 | Das |
| 4,979,874 | A | | 12/1990 | Myers |
| 5,035,573 | A | | 7/1991 | Tseng et al. |
| 5,387,080 | A | * | 2/1995 | Bouhennicha et al. ....... 415/150 |
| 5,549,448 | A | | 8/1996 | Langston |
| 5,593,275 | A | * | 1/1997 | Venkatasubbu et al. ...... 415/160 |
| 5,601,401 | A | * | 2/1997 | Matheny et al. .............. 415/160 |
| 5,807,072 | A | | 9/1998 | Payling |
| 6,019,574 | A | | 2/2000 | DiBella |
| 6,330,995 | B1 | * | 12/2001 | Mangeiga et al. ............ 248/554 |
| 6,457,938 | B1 | | 10/2002 | Liu et al. |

(Continued)

FOREIGN PATENT DOCUMENTS

| | | | | |
|---|---|---|---|---|
| GB | 2217790 | A | * | 11/1989 |
| GB | 2440346 | A | * | 1/2008 |
| GB | 2470586 | A | * | 12/2010 |

*Primary Examiner* — Edward Look
*Assistant Examiner* — Christopher R Legendre
(74) *Attorney, Agent, or Firm* — Dority & Manning

(57) ABSTRACT

An attachment stud for a variable vane assembly is disclosed. The attachment stud may generally include a bottom segment, a middle segment, a top segment and a shoulder segment. The bottom segment may generally have a shape and configuration adapted to be secured to a synchronizing ring of the variable vane assembly. The middle segment may generally have a shape and configuration adapted to receive a rotational attachment device of the variable vane assembly. The shoulder segment may be disposed between the bottom segment and the middle segment. The top segment may generally have a shape and configuration adapted to receive a retaining device configured to rigidly attach the rotational attachment device to the attachment stud.

20 Claims, 4 Drawing Sheets

(56) References Cited

U.S. PATENT DOCUMENTS

| | | |
|---|---|---|
| 6,984,104 B2 * | 1/2006 | Alexander et al. ............ 415/159 |
| 7,096,657 B2 | 8/2006 | Mahoney et al. |
| 7,114,911 B2 | 10/2006 | Martin et al. |
| 7,198,461 B2 * | 4/2007 | Burgmeier et al. ........... 415/160 |
| 7,223,066 B2 * | 5/2007 | Rockley ........................ 415/160 |
| 7,246,484 B2 | 7/2007 | Giffin, III et al. |
| 7,396,203 B2 | 7/2008 | Martindale |
| 7,448,848 B2 * | 11/2008 | Alexander et al. ............ 415/159 |
| 7,524,165 B2 * | 4/2009 | Bourgoin et al. ............. 415/160 |
| 7,530,784 B2 * | 5/2009 | Ribassin et al. .............. 415/160 |
| 7,594,794 B2 | 9/2009 | Merry et al. |
| 2006/0133890 A1 * | 6/2006 | Etoile et al. ................... 403/122 |
| 2009/0074568 A1 | 3/2009 | Suciu et al. |
| 2009/0162192 A1 | 6/2009 | McCaffrey |
| 2009/0285673 A1 | 11/2009 | Giamo et al. |
| 2009/0318238 A1 | 12/2009 | Bolgar et al. |
| 2012/0076641 A1 * | 3/2012 | Jarrett et al. .................. 415/160 |
| 2012/0076658 A1 * | 3/2012 | Jarrett et al. .................. 416/205 |

* cited by examiner

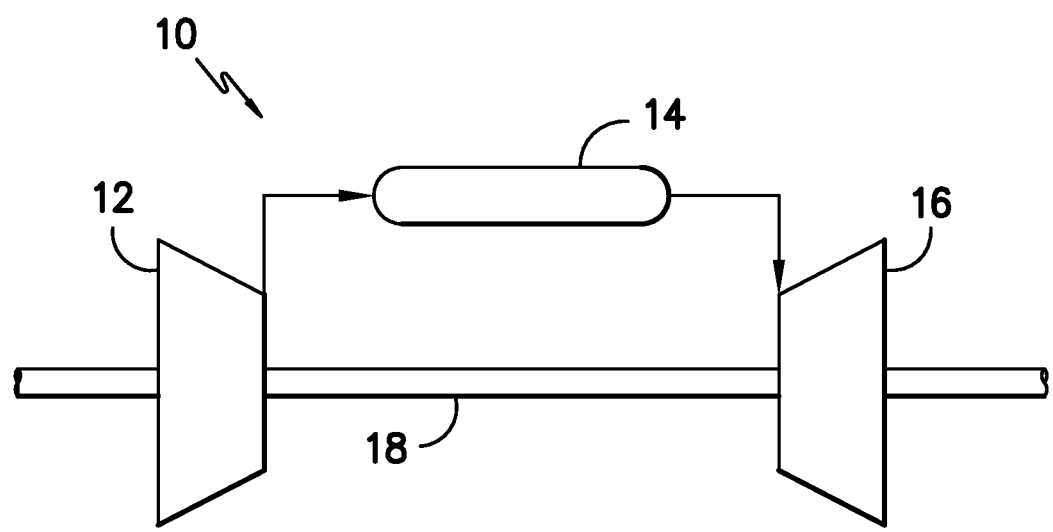
FIG. -1-

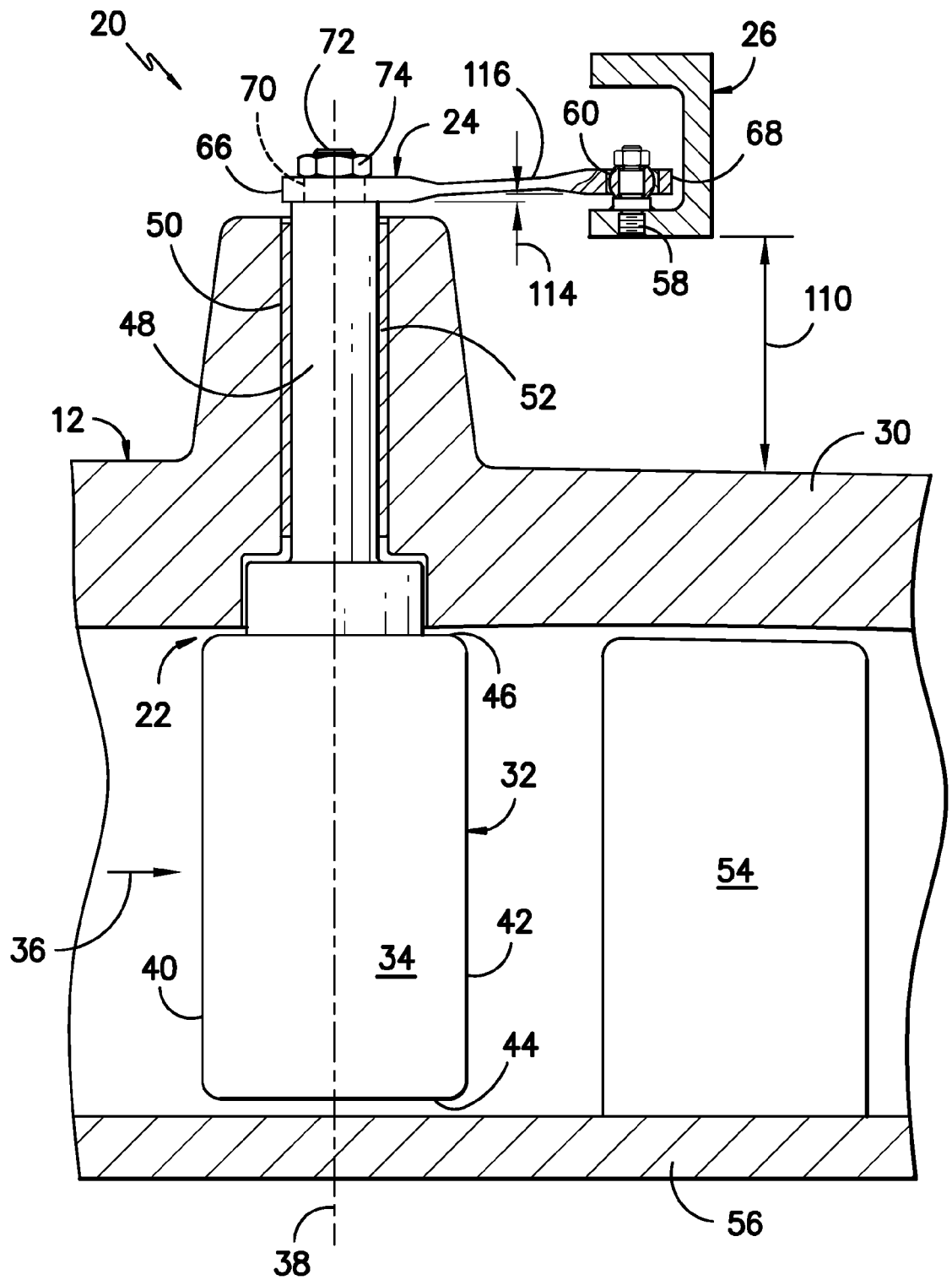
FIG. -2-

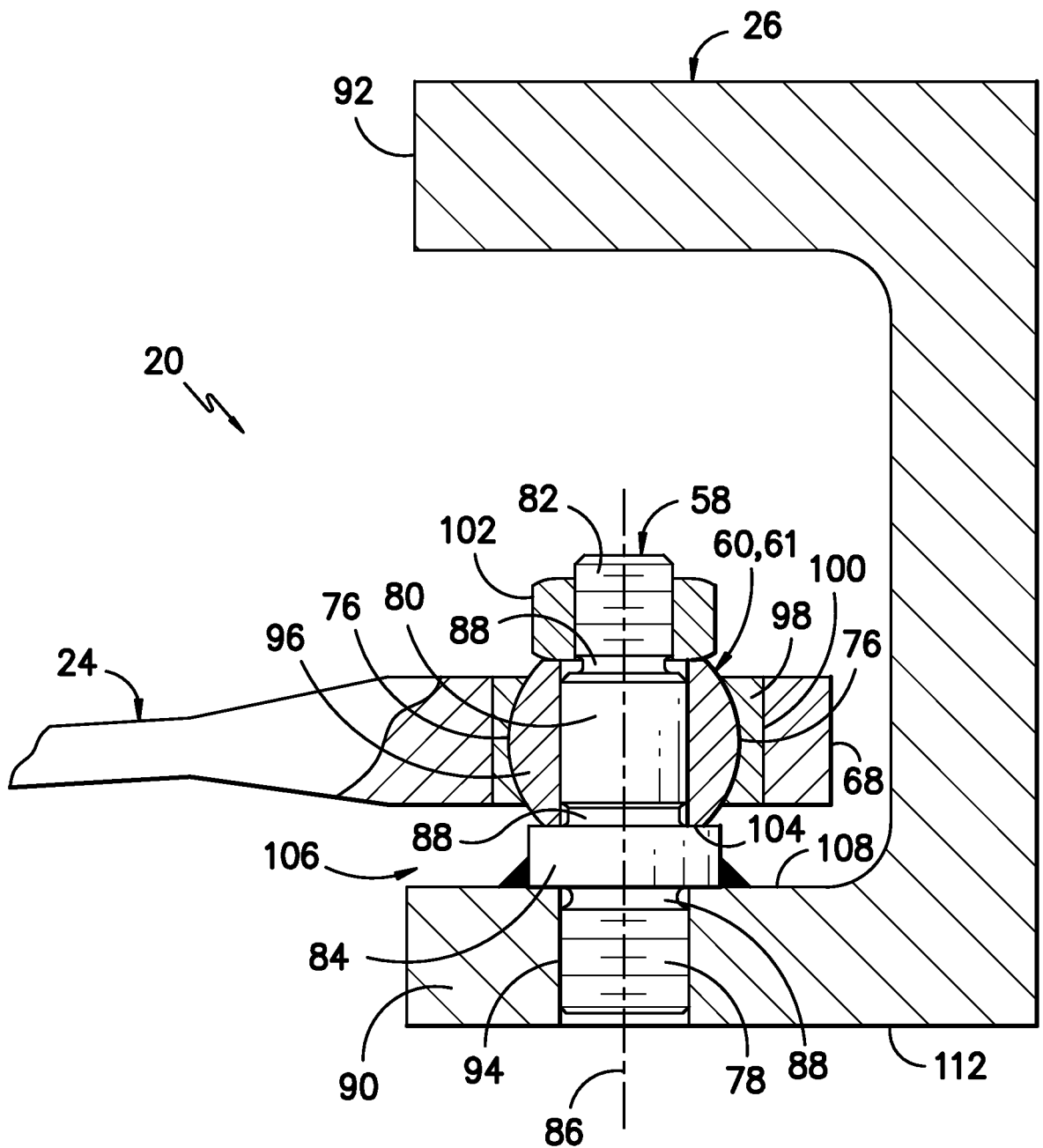
FIG. -3-

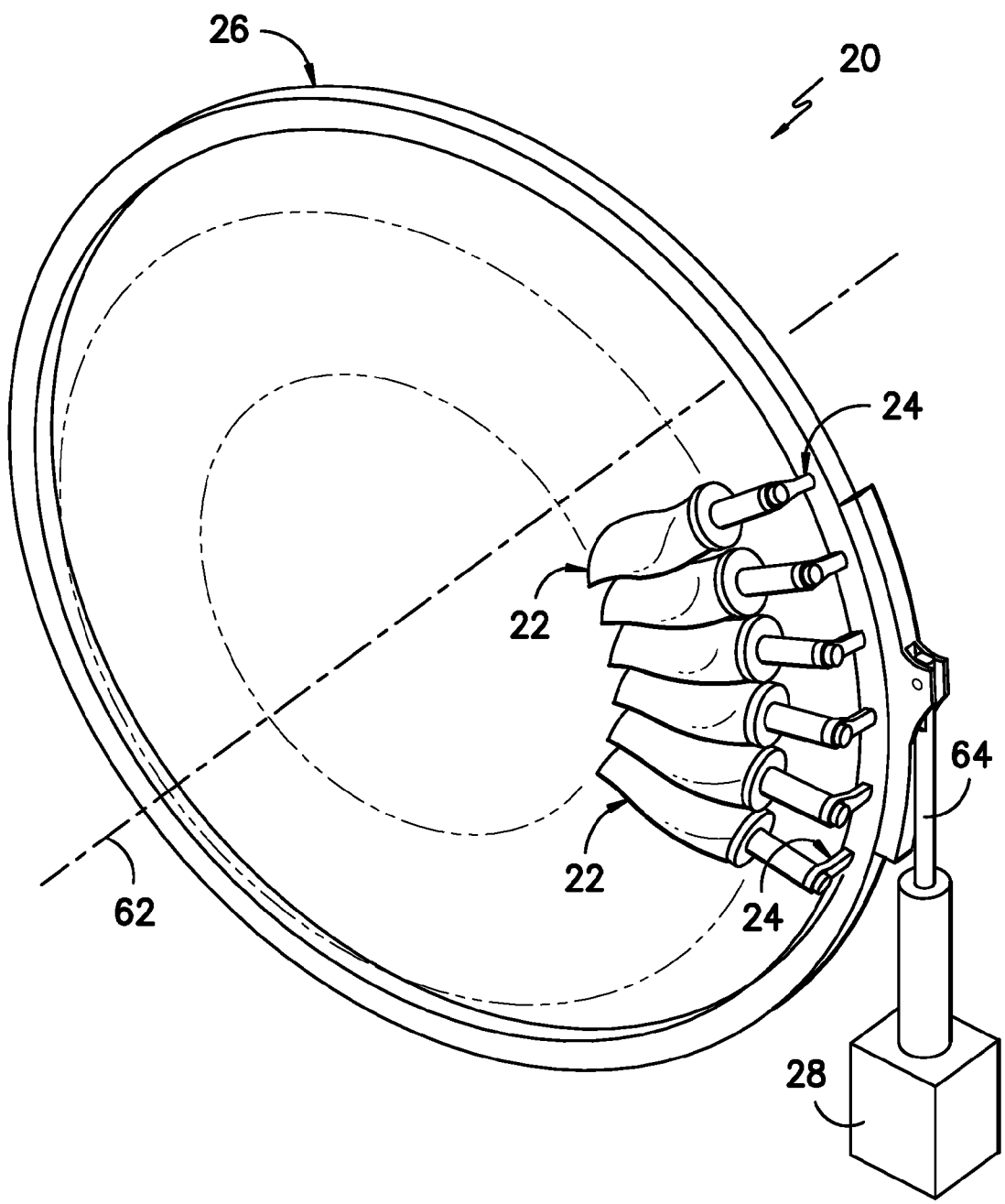
FIG. —4—

ATTACHMENT STUD FOR A VARIABLE VANE ASSEMBLY OF A TURBINE COMPRESSOR

FIELD OF THE INVENTION

The present subject matter relates generally to gas turbines and, more particularly, to an attachment stud for a variable vane assembly of a compressor.

BACKGROUND OF THE INVENTION

Gas turbines typically include a compressor, a plurality of combustors, and a turbine section. The compressor pressurizes air flowing into the turbine. The pressurized air discharged from the compressor flows into the combustors. Air entering each combustor is mixed with fuel and combusted. Hot combustion gases flow from each combustor through a transition piece to the turbine section of the gas turbine to drive the turbine and generate power.

A typical compressor for a gas turbine may be configured as a multi-stage axial compressor and may include both rotating and stationary components. A shaft drives a central rotor drum or wheel, which has a number of annular rotors. Rotor stages of the compressor rotate between a similar number of stationary stator stages, with each rotor stage including a plurality of rotor blades secured to the rotor wheel and each stator stage including a plurality of stator vanes secured to an outer casing of the compressor. During operation, airflow passes through the compressor stages and is sequentially compressed, with each succeeding downstream stage increasing the pressure until the air is discharged from the compressor outlet at a maximum pressure.

In order to improve the performance of a compressor, one or more of the stator stages may include variable stator vanes configured to be rotated about their longitudinal or radial axes. Such variable stator vanes generally permit compressor efficiency and operability to be enhanced by controlling the amount of air flowing into and through the compressor by rotating the angle at which the stator vanes are oriented relative to the flow of air. Rotation of the variable stator vanes is generally accomplished by attaching a lever arm to each stator vane and joining each of the levers to a unison or synchronizing ring disposed substantially concentric with respect to the compressor casing. The synchronizing ring, in turn, is coupled to an actuator configured to rotate the ring about the central axis of the compressor. As the synchronizing ring is rotated by the actuator, the lever arms are correspondingly rotated, thereby causing each stator vane to rotate about its radial or longitudinal axis.

Current synchronizing ring and lever arm assemblies generally configure the lever arms to have a sliding engagement with the synchronizing ring at the rotational interface between such components. In particular, the lever arm is typically configured to slide radially and/or circumferentially at the rotational interface between the lever arm and the synchronizing ring as the ring is rotated. This sliding engagement generally produces excessive wear on the assembly components disposed at this sliding interface. Moreover, the sliding engagement utilized in conventional assemblies often provides inadequate support for the synchronizing ring. In particular, due to the relative sliding occurring between the lever arms and the synchronizing ring during rotation of the ring, the lever arms disposed at the top of the synchronizing ring typically do not support any of the ring weight. Accordingly, the lever arms disposed around the bottom of the synchronizing ring must support the full weight of the ring. Such inadequate support can lead to even further wear of the components disposed at the attachment interfaces between the lever arms and the synchronizing ring. Further, inadequate support may also result in excessive wear on the rub blocks circumferentially spaced around compressor casing, as the rub blocks must be utilized to support a portion of the ring weight.

Accordingly, an attachment stud for a variable vane assembly that provides for a reduction of the occurrence of wear within the assembly would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses an attachment stud for a variable vane assembly. The attachment stud may generally include a bottom segment, a middle segment, a top segment and a shoulder segment. The bottom segment may generally have a shape and configuration adapted to be secured to a synchronizing ring of the variable vane assembly. The middle segment may generally have a shape and configuration adapted to receive a rotational attachment device of the variable vane assembly. The shoulder segment may be disposed between the bottom segment and the middle segment. The top segment may generally have a shape and configuration adapted to receive a retaining device configured to rigidly attach the rotational attachment device to the attachment stud.

In another aspect, the present subject matter discloses an attachment stud for a variable vane assembly. The attachment stud may generally include a bottom threaded segment, a middle segment, a top threaded segment and a shoulder segment, with each of the segments being coaxially aligned with a central axis of the attachment stud. The bottom threaded segment may generally have a shape and configuration adapted to be secured within a corresponding threaded hole defined in a synchronizing ring of the variable vane assembly. The middle segment may generally define a bearing surface configured such that a bearing of the variable vane assembly may be mounted thereon. The shoulder segment may generally be disposed between the bottom threaded segment and the middle segment and may be configured to be secured to a surface of the synchronizing ring. The top threaded segment may generally have a shape and configuration adapted to receive a threaded retaining device configured to rigidly attach the bearing to the attachment stud.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic depiction of a gas turbine;

FIG. 2 provides a cross-sectional view of one embodiment of a variable vane assembly in accordance with aspects of the present subject matter, particularly illustrating the variable vane assembly coupled to one of a plurality of variable stator vanes of a compressor;

FIG. 3 provides an enlarged view of a portion of the embodiment of the variable vane assembly illustrated in FIG. 2, particularly illustrating the attachment of the lever arm to the synchronizing ring; and FIG. 4 provides a partial perspective view of an embodiment of a variable vane assembly, particularly illustrating the synchronizing ring and an actuation device coupled to the synchronizing ring.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a schematic diagram of a gas turbine 10. The gas turbine 10 generally includes a compressor 12, a plurality of combustors 14, and a turbine section 16. The compressor 12 and turbine section 16 may generally be coupled by a shaft 18. The shaft 18 may be a single shaft or a plurality of shaft segments coupled together to form the shaft 18. In one embodiment, the compressor 12 may comprise a multi-stage axial compressor having a plurality of corresponding rotor and stator stages. In such an embodiment, one or more of the stator stages may include a plurality of variable stator vanes. For example, the compressor 12 may include a plurality of fixed stator vanes in its downstream stages, with the variable stator vanes being disposed in the upstream stages thereof. Alternatively, all of the stator stages of a compressor 12 may include variable stator vanes.

During operation of the gas turbine 10, the compressor 12 supplies compressed air to the combustors 14. Air and fuel are mixed and burned within each combustor 14 and hot gases of combustion flow in a hot gas path from the combustors 14 to the turbine section 16, wherein energy is extracted from the combustion gases to produce work.

Referring now to FIGS. 2-4, there is illustrated various views of embodiments of a variable vane assembly 20 for actuating a plurality of variable stator vanes 22 in accordance with aspects of the present subject matter. In particular, FIG. 2 illustrates a cross-sectional view of an embodiment of the disclosed variable vane assembly 20 coupled to one of the stator vanes 22. FIG. 3 illustrates an enlarged view of a portion of the variable vane assembly 20 illustrated in FIG. 2, particularly illustrating the attachment of the lever arm 24 to the synchronizing ring 26. Additionally, FIG. 4 illustrates a partial perspective view of an embodiment of the disclosed variable vane assembly 20, particularly illustrating the synchronizing ring 26 and an actuation device 28 coupled to the synchronizing ring 26.

As particularly shown in FIG. 2, the compressor 12 of a gas turbine 10 may include one or more stator stages having a plurality of variable stator vanes 22 (one of which is illustrated) rotatably mounted within an outer compressor casing 30. Each stator vane 22 generally includes an airfoil segment 32 having a first or pressure side 34 and a circumferentially opposite second or suction side (not shown) which define the aerodynamic surface of the vane 22 over which air 36 flows during operation of the compressor 12. The pressure and suction sides generally extend axially along a chord 38 between opposite leading and trailing edges 40, 42 and radially span from a radially inner tip 44 to a radially outer root 46. Each stator vane 22 also includes an integral stem segment 48 extending coaxially and radially outwardly from the airfoil segment 32 and through a complementary cylindrical aperture 50 defined in the casing. The stem segment 48 may generally be mounted within the aperture 50 for rotation therein. For example, a bushing 52 may be disposed at the interface of the casing 30 and the stem segment 48 to permit the stator vane 22 to be rotated relative to the casing 30.

Each stator vane 22 of the compressor 12 may generally be configured to channel the air 36 flowing through the compressor 12 to a corresponding row or stage of rotor blades 54 extending radially outwardly from a supporting rotor disc or wheel 56. In particular, the air 36 channeled through each stage of stator vanes 22 and rotor blades 54 may be sequentially compressed within the compressor 12 for discharge thereof into the combustors 14 of the gas turbine 10. As is generally understood, by altering or rotating the angle at which the stator vanes 22 are oriented relative to the flow of air 36, the compressor efficiency and operability can be enhanced by regulating the amount of air 36 flowing into and through the compressor 12. To facilitate such rotation of the stator vanes 22, a variable vane assembly 20, as described in detail below, may be utilized.

Referring to FIGS. 2-4, the variable vane assembly 20 of the present subject matter generally includes a synchronizing ring 26 configured to actuate a plurality of outwardly extending lever arms 24 mounted onto and rigidly attached to each stator vane 22 of a particular stator stage of a compressor 12. The synchronizing ring 26 may generally be coupled to the lever arms 24 through a plurality of attachments studs 58 secured along the circumference of the ring 26. In addition, the variable vane assembly 20 may also include a plurality of rotational attachment devices 60 disposed between the lever arms 24 and the attachment studs 58 so as to define a rotational interface about which the lever arms 24 may rotate relative to the attachment studs 58 and/or the synchronizing ring 26. Moreover, as is particularly shown in FIG. 4, the synchronizing ring 26 may also be coupled to one or more suitable actuation devices 28 configured to rotate the synchronizing ring 26 about a central axis 62 of the compressor 12. For example, the synchronizing ring 26 may be coupled to the actuation device(s) 28 via any suitable means (e.g., through a push-rod linkage 64) such that the actuation device(s) 28 rotate the synchronizing ring 26 clockwise or counter-clockwise about the central axis 62. Accordingly, as the synchronizing ring 26 is rotated by the actuation device(s) 28, the lever arms 24 may correspondingly rotate about the attachment studs 58. The rotating lever arms 24, in turn, cause the stator vanes 22 to rotate, thereby altering the angle at which the vanes 22 are oriented relative to the flow of air 36 within the compressor 12.

In general, the synchronizing ring 26 of the variable vane assembly 20 may comprise a circular or ring-like structure disposed radially outwardly from and substantially concentric with the compressor casing 30. In several embodiments, the synchronizing ring 26 may be manufactured as a one-piece or multiple-piece construction and may be formed from any suitable material, such as a stainless steel or any other material capable of withstanding the loads typically applied to a synchronizing ring. Additionally, the synchronizing ring 26 may generally have any suitable cross-section, such as a rectangular, elliptical or circular cross-section. As particularly shown in FIGS. 2 and 3, in one embodiment, the synchronizing ring 26 may define a generally "C-shaped" cross-section. As such, the synchronizing ring 26 may be configured to be relatively lightweight without sacrificing the structural integrity of the ring 26.

Referring more particularly to FIG. 2, each lever arm 24 of the variable vane assembly 20 may generally include a first end 66 rigidly attached to the stein segment 48 of a variable stator vane 22 and a second end 68 rotatably engaged with and rigidly attached to the synchronizing ring 26 through an attachment stud 58. Generally, the first end 66 of each lever arm 24 may be secured to the stator vane 22 using any suitable means. For example, in one embodiment, the stator vane 22 may include a keyed seat 70 (e.g., a "D-shaped" seat) extending radially outward from the stem segment 48 and a threaded stem 72 extending radially outward from the keyed seat 70. The keyed seat 70 may generally be configured as a self-alignment feature for mounting the lever arm 24 atop the stator vane 22. For example, the first end 66 of the lever arm 24 may define a mounting hole configured to correspond to the shape of the keyed seat 70 (e.g., a D-shaped mounting hole) so as to permit the lever arm 24 to be mounted to the stator vane 22 for rotation therewith. The lever arm 24 may then be secured to the stator vane 22 by positioning a threaded nut 74, such as a retaining nut or a lock nut, onto the threaded stem 72.

It should be apparent to those of ordinary skill in the art that various other configurations may be utilized within the scope of the present subject matter to mount and/or rigidly attach the first end 66 of the lever arm 24 to the stem segment 48 of the stator vane 22. For example, in several embodiments, keyed splines, crenulated surfaces in matching correspondence or other suitable means may be utilized to mount or otherwise engage the lever arm 24 with the stator vane 22. Similarly, in various embodiments, the lever arm 24 may be secured to the stator vane 22 using a retaining pin or a latch, by welding the components together or using any other suitable fastening and/or securing means.

Referring now to FIG. 3, the second end 68 of each lever arm 24 may generally be configured to be rotatably coupled with the synchronizing ring 26 through an attachment stud 58. Specifically, a rotational attachment device 60 may be disposed between each lever arm 24 and its corresponding attachment stud 58 such that a rotational interface 76 is defined therebetween. Accordingly, the lever arm 24 may be allowed to rotate relative to the synchronizing ring 26 and/or the attachment stud 58 at such interface 76. Further, each attachment stud 58 may also be configured to be rigidly attached to a portion of the rotational attachment device 60 such that there is no relative motion or substantially no relative motion between the synchronizing ring 26 and the rotational interface 76 about which the lever arm 24 rotates. As such, the lever arm 24 may be prevented or substantially prevented from sliding radially, circumferentially or any other direction relative to the synchronizing ring 26 and/or the attachment stud 58 during rotation of the ring 26.

To permit such rotational coupling and rigid attachment of the various components of the variable vane assembly 20, in one embodiment, each attachment stud 58 may generally include a plurality of segments, such as a bottom segment 78, a middle segment 80, a top segment 82 and a shoulder segment 84 disposed between the bottom and middle segments 78, 80. As shown in FIG. 3, each of the segments 78, 80, 82, 84 may generally be coaxially aligned along a central axis 86 of the attachment stud 58. Additionally, in one embodiment, each of the segments 78, 80, 82, 84 may be substantially cylindrically shaped. However, in alternative embodiments, it should be appreciated that each segment 78, 80, 82, 84 may generally have any suitable shape that permits the segment 78, 80, 82, 84 to function as described herein. Further, in a particular embodiment of the present subject matter, each of the segments 78, 80, 82, 84 may be separated by an undercut fillet 88. Such fillets 88 may generally be provided on the attachment stud 58 to serve areas of low stress/stress relief. Additionally, the undercut fillets 88 may also be provided to enhance the attachment of the segments 78, 80, 82, 84 to the various other components of the variable vane assembly 20. Specifically, the fillets 88 may permit the surfaces and/or faces of the segments 78, 80, 82, 84 and the other components to be positioned or otherwise disposed substantially flush with one another.

Referring still to FIG. 3, the bottom segment 78 of the attachment stud 58 may generally be configured to be secured to a portion of the synchronizing ring 26. For example, in the illustrated embodiment, the bottom segment 78 may be secured to a lower extension 90 of the generally "C-shaped" synchronizing ring 26 such that the attachment stud 58 extends substantially radially outwardly therefrom. In alternative embodiments, it should be appreciated that the bottom segment 78 may be secured to the synchronizing ring 26 at any other suitable location. For instance, in another embodiment, the bottom segment 78 may be secured to an upper extension 92 of the synchronizing ring 26 such that the attachment stud 58 extends radially outwardly or radially inwardly therefrom. Further, in embodiments in which the synchronizing ring 26 does not define a generally "C-shaped" cross-section, the bottom segment 78 may be secured to any suitable portion of the synchronizing ring 26 that permits the disclosed variable vane assembly 20 to function as described herein.

Additionally, it should be appreciated the bottom segment 78 of the attachment stud 58 may generally be secured to the synchronizing ring 26 using any suitable attachment method known in the art. For example, as shown in FIG. 3, the bottom segment 78 may be threaded such that it can be secured within a corresponding threaded hole 94 defined in the synchronizing ring 26. In another embodiment, the bottom segment 78 may be configured to be press-fit or adhesively bonded within a corresponding bore hole (not illustrated) defined in the synchronizing ring 26.

Still referring to FIG. 3, in one embodiment, the middle segment 80 of each attachment stud 58 may generally serve as the rotational attachment point between the lever arm 24 and the synchronizing ring 26. As such, the middle segment 80 may be configured to receive any suitable rotational attachment device 60 known in the art for rotationally engaging the lever arm 24 with the synchronizing ring 26 via the attachment stud 58. For example, in the illustrated embodiment, the rotational attachment device 60 comprises a bearing 61 mounted onto or otherwise disposed around the middle segment 80 so as to define a rotational interface 76 between the lever arm 24 and the attachment stud 58. As such, it should be appreciated that the middle segment 80 may generally have a shape and configuration adapted to receive the bearing 61. For instance, in one embodiment, the middle segment 80 may define a smooth cylindrical or bearing surface such that the bearing 61 may be mounted thereon. Additionally, the middle segment 80 may be sized so that a tightly controlled fit is provided between the bearing 61 and the attachment stud 58. For example, the tolerance provided between the bearing 61 and the middle segment 80 may be less than about 1 millimeter (mm) loose on a diameter, such as less than about 0.5 mm loose on a diameter or less than about 0.1 mm loose on a diameter. In a particular embodiment of the present subject matter, the tolerance may range from about 0.01 mm loose on a diameter to about 0.07 mm loose on a diameter, such as from about 0.03 mm loose on a diameter to about 0.05 mm loose on a diameter and all other subranges therebetween. However, in an alternative embodiments, it should be appreciated that the tolerance provided may be greater than 1 mm loose on a diameter.

Generally, any suitable bearing known in the art may be utilized within scope of the present subject matter to provide rotational engagement between the lever arm 24 and the attachment stud 58. As shown in FIG. 3, in one embodiment, the bearing 61 may comprise a spherical bearing having an inner ball 96 mounted onto the middle segment 80 of the attachment stud 58 and an outer ring bore 98 secured within a corresponding bore hole 100 defined in the second end 68 of the lever arm 24. The outer ring bore 98 may generally have an inner concave spherical surface corresponding to the outer convex spherical surface of the inner ball 96 to permit the outer ring bore 98 to rotate in one or more orthogonal directions relative to the inner ball 96. Thus, as synchronizing ring 26 is rotated by the actuation device(s) 28, each lever arm 24 may rotate and/or twist about the rotational interface 76 defined between the inner ball 96 and outer ring bore 98 of the bearing 61.

It should be readily apparent to those of ordinary skill in the art that various other suitable rotational attachment devices 60 may be utilized within the scope of the present subject matter to rotatably engage the lever arms 24 with the synchronizing ring 26 via the attachment studs 58 and, thus, provide a rotational interface 76 about which the lever arms 24 may rotate relative to the ring 26 and/or the attachment studs 28. For example, in alternative embodiments, the rotational attachment device 60 may comprise a portion of a suitable pivot joint, such as a ball and socket joint, condyloid joint, hinge joint or the like, which is configured to mate with the corresponding feature defined in or otherwise included on the attachment stud 58. In another embodiment, the attachment stud 58, itself, may serve as the rotational attachment device 60 of the variable vane assembly 20. For example, the lever arm 24 or a component mounted to the lever arm 24 may be configured to rotate directly about the attachment stud 58 (e.g., about the middle segment 80) such that the outer surface of the attachment stud 58 generally defines the rotational interface 76.

Referring still to FIG. 3, as indicated above, the second end 68 of the lever arm 24 may also be configured to be rigidly coupled to the synchronizing ring 26 via the attachment stud 58 such that there is no relative motion or substantially no relative motion between the synchronizing ring 26 and the rotational interface 76 about which the lever arm 24 rotates. Thus, in one embodiment, the top segment 82 of the attachment stud 58 may generally be adapted to receive a retaining device 102 configured to permit the rotational attachment device 60 to be rigidly attached to the attachment stud 58. For example, as shown in FIG. 3, the inner ball 96 of the bearing 61, defining the rotational interface 76 between the lever arms 24 and the attachment studs 58, may be rigidly attached to the attachment stud 58 such that the inner ball 96 does not slide or otherwise move relative to the synchronizing ring 26 during rotation of the ring 26. Specifically, the top segment 82 of the attachment stud 58 may be threaded so as to permit a threaded retaining device 102 (e.g., a lock nut or a retaining nut) to be tightly secured over the inner ball 96 of the bearing 61. Additionally, as shown, the shoulder segment 84 of the attachment stud 58 may generally extend outwardly from the central axis 86 of the attachment stud 58 further than the middle segment 80 such that the inner ball 96 may be positioned or otherwise disposed against a radially outer face 104 of the shoulder segment 84. As such, when the retaining device 102 is secured over the bearing 61, the inner ball 96 may be pinched, pressed or otherwise rigidly attached between the retaining device 102 and the outer face 104 of the shoulder segment 84 to prevent any relative motion between the synchronizing ring 26 and the rotational interface 76 about which the lever arm 24 rotates. Further, it should be appreciated that the undercut fillets 88 defined in the attachment stud 58 may be configured to enhance the rigid attachment of the inner ball 96 to the attachment stud 58. For example, fillet 88 defined between the shoulder segment 84 and the middle segment 80 may be configured to allow the inner ball 96 to be positioned flush against the outer face 104 of the shoulder segment 84. Similarly, the fillet 88 defined between the top segment 82 and the middle segment 80 may be configured to allow the threads of the top segment 82 be buried or otherwise fully disposed within the retaining device 102.

It should also be appreciated that, in alternative embodiments, various other retaining devices 102, such as lock pins, latches, or any other suitable fastening mechanisms may be utilized to rigidly attach the inner ball 96 of the spherical bearing 61 to the attachment stud 58. Likewise, any suitable securing/fastening means, such as welding, adhesive bonding and the like, may also be utilized to rigidly attach the inner ball 96 to the attachment stud 58. For example, in a particular embodiment of the present subject matter, a portion of the attachment stud 58 (e.g., the middle segment 80) may be configured such that the inner ball 96 may be press-fit onto the attachment stud 58 to provide a rigid attachment therebetween. Additionally, in embodiments in which the rotational engagement between the attachment studs 58 and the lever arms 24 is provided by means other than a bearing 61, it should be appreciated that similar retaining devices 102 and/or securing means may be utilized to prevent relative motion between the synchronizing ring 26 and the rotational interface 76 about which each of the lever arms rotate.

By rigidly coupling the synchronizing ring 26 to the lever arms 24 via the attachment studs 58, numerous advantages may be provided to the disclosed variable vane assembly 20. For example, due to the rigid attachment at the rotational interface 76, circumferential and radial sliding movements that may otherwise occur between the lever arms 24 and the synchronizing ring 26 may be prevented or, at the very least, reduced. As such, any wear occurring at the attachment studs 58, bearings 61, lever arms 24 and/or the synchronizing ring 26 may be reduced significantly and/or prevented. Moreover, the rigid coupling of each lever arm 24 to the synchronizing ring 26 ensures that all of the lever arms 24 rigidly support the weight of the synchronizing ring 26 around its entire circumference. Accordingly, the concentricity or circularity of the synchronizing ring 26 may be maintained. Additionally, the added support provided to the synchronizing ring 26 may also reduce the amount of wear occurring on rub blocks (not illustrated), if any, disposed between the synchronizing ring 26 and the compressor casing 30, as it would not be necessary for the rub blocks to support a substantial portion of the ring weight. Further, the rigid coupling may also lessen the burden of centering the synchronizing ring 26 on the compressor casing 30 during rigging and calibration of the variable vane assembly 20.

Referring still to FIG. 3, the shoulder segment 84 of the attachment stud 58 may generally be configured such that, when the lever arm 24 is rotatably attached to the attachment stud 58, a gap 106 is provided between the lever arm 24 and an adjacent surface 108 of the synchronizing ring 26. In general, the gap 106 may be configured to accommodate any twisting of the lever arms 24 that may occur relative to the attachment studs 58 and/or the synchronizing ring 26. For example, when a lever arm 24 is rotatably engaged with the synchronizing ring 26 utilizing a spherical bearing 61 mounted to the attachment stud 58, the bearing 61 may permit the lever arm 24 to both rotate about central axis 86 of the attachment stud and twist along its longitudinal axis in a clockwise or counter-clockwise direction. Accordingly, the shoulder 84 may generally be designed to provide a gap 106 that permits the lever arm 24 to twist about the rotational interface 76 without contacting or rubbing against the adjacent surface 108 of the synchronizing ring 26.

Further, in a particular embodiment of the present subject matter, the shoulder segment 84 may be configured to be secured to the synchronizing ring 26 to provide an additional means for attaching the attachment stud 58 to the synchronizing ring 26. For example, as shown in FIG. 3, the shoulder segment 84 may be welded to an adjacent surface 108 of the synchronizing ring 26 around at least a portion of the shoulder segment's perimeter. In such an embodiment, the shoulder segment 84 may be configured to have a triangular, rectangular, pentagonal, hexagonal or similar shape so as to define at least one planar edge for providing a suitable surface for welding the shoulder segment 84 to the synchronizing ring 26. Moreover, when an undercut fillet 88 is defined between the bottom segment 78 and the shoulder segment 84, the shoulder segment 84 may be positioned directly onto and substantially flush with the adjacent surface 108 of the synchronizing ring 26. As such, an improved welded attachment may be provided between the shoulder segment 84 and the ring 26.

Referring back to FIG. 2, in one embodiment of the present subject matter, the lever arms 24 of the variable vane assembly 20 may be cantilevered. As such, the synchronizing ring 26 may be suspended over the compressor casing 30. It should be appreciated that the distance 110 at which the synchronizing ring 26 is suspended over the compressor casing 30 may generally vary depending on the configuration of the compressor 12 and/or the configuration of the variable vane assembly 20. However, in general, the distance 110 may be chosen such that the suspended synchronizing ring 26 does not rub against or otherwise contact the compressor casing 30 while the ring 26 is being rotated. Additionally, in one embodiment, one or more rub blocks (not illustrated) may be provided along the outer circumference of the compressor casing 30 to provide a surface(s) upon which the suspended synchronizing ring 26 may slide, if necessary, during rotation of the ring 26. In such an embodiment, as shown in FIG. 3, the attachment stud 58 may be configured so that the bottom segment 78, when secured to the synchronizing ring 26, is recessed relative to a radially inner surface 112 of the ring 26. Accordingly, the attachment stud 58 may be prevented from catching against any of the rub blocks and/or the compressor casing 30 during rotation of the ring 26.

Additionally, in several embodiments of the present subject matter, the lever arms 24 may designed to be flexible. Specifically, the lever arms 24 may be configured to flex or bow radially inwardly and/or radially outwardly while supporting the synchronizing ring 26. Thus, in a particular embodiment of the present subject matter, the diameter of the synchronizing ring 26 and/or the height of the stem segment 48 of the stator vane 22 may be chosen such that the attachment point of the lever arm 24 to the attachment stud 58 is disposed further radially outward than the attachment point of the lever arm 24 to the stem segment 48. Thus, as shown in FIG. 2, the lever arm may be bowed or flexed radially outwardly a distance 114 between its first and second ends 66, 68. Such outward bowing or flexing ensures that the lever arms 24 are loaded radially inwardly. Accordingly, when the synchronizing ring 26 is actuated and the lever arms 24 change horizon while being rotated, the lever arms 24 may continuously apply an inward load on the ring 26 to support its weight. This inward loading of the lever arms 24 may also provide a self-centering effect on the synchronizing ring 26, thereby allowing for more efficient rigging and calibration of the variable vane assembly 20. Moreover, as shown in FIG. 2, in one embodiment, the lever arms may also define a substantially tapered profile 116 along a portion of its length between the first and second ends 66, 68. Such tapered profile 116 may generally prevent the occurrence of stress risers within the lever arms 24 as the arms 24 rotate in response to actuation of the synchronizing ring 26.

It should be appreciated that, although the variable vane assembly 20 of the present subject matter has been described with regard to variable stator vanes 22, the assembly may also be utilized to actuate a stage of variable inlet guide vanes of a compressor 12 or a stage of variable turbine blades or vanes of a turbine section 16 of a gas turbine 10. Moreover, it should be readily apparent that the disclosed variable vane assembly 20 may be utilized with an industrial gas turbine or may be adapted for use with any other suitable turbomachines known in the art, such as those used in propulsion applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An attachment system for a variable vane assembly, the variable vane assembly including a synchronizing ring coupled to a lever arm by an attachment stud, the variable vane assembly further including a rotational attachment devices configured to rotatably couple the lever arms with the synchronizing ring, the attachment stud comprising:
   a bottom segment having a shape and configuration adapted to be secured to the synchronizing ring;
   a middle segment having a shape and configuration adapted to receive the rotational attachment device;
   a shoulder segment disposed between the bottom segment and the middle segment; and
   a top segment having a shape and configuration adapted to receive a retaining device configured to rigidly attach the rotational attachment device to the attachment stud.

2. The attachment system of claim 1, wherein the bottom segment, the middle segment, the shoulder segment and the top segment are coaxially aligned along a central axis of the attachment stud.

3. The attachment system of claim 1, wherein the bottom segment is threaded and is configured to be secured within a corresponding threaded hole defined in the synchronizing ring.

4. The attachment system of claim 1, wherein the bottom segment is configured to be recessed relative to a radially inner surface of the synchronizing ring.

5. The attachment system of claim 1, wherein the shoulder segment is configured such that a gap is defined between the synchronizing ring and the lever arm.

6. The attachment system of claim 5, wherein the gap permits the lever arm to twist along its longitudinal axis without contacting the synchronizing ring.

7. The attachment system of claim 1, wherein the shoulder segment is configured to be secured to a surface of the synchronizing ring.

8. The attachment system of claim 7, wherein the shoulder segment is configured to be welded to the synchronizing ring, the shoulder segment defining at least one planar edge for welding the shoulder segment to the surface of the synchronizing ring.

9. The attachment system of claim 1, wherein the top segment is threaded to permit a threaded retaining device to be secured thereon.

10. The attachment system of claim 9, wherein the middle segment defines a bearing surface.

11. The attachment system of claim 10, wherein the rotational attachment device comprises a bearing having an inner component and an outer component configured to rotate relative to the inner component, the bearing surface being configured to permit the bearing to be mounted thereon.

12. The attachment system of claim 11, wherein the shoulder segment extends outwardly from a central axis of the attachment stud further than the middle segment such that the inner component of the bearing is positioned against a face of the shoulder segment when the threaded retaining device is secured to the top segment.

13. The attachment system of claim 1, further comprising a first fillet and a second fillet, the first fillet being defined in the attachment stud between the top segment and the middle segment and being configured to allow the retaining device to be secured against the rotational attachment device, the second fillet being defined in the attachment stud between the middle segment and the shoulder segment and being configured to allow the rotational attachment device to be positioned against a face of the shoulder segment.

14. An attachment system for a variable vane assembly, the variable vane assembly including a synchronizing ring coupled to a lever arms by an attachment stud, the variable vane assembly further including a bearings configured to rotatably couple the lever arms with the synchronizing ring, the attachment stud comprising:

a bottom threaded segment having a shape and configuration adapted to be secured within a corresponding threaded hole defined in the synchronizing ring;

a middle segment defining a bearing surface, the bearing surface having a shape and configuration adapted to permit the bearing to be mounted thereon;

a shoulder segment disposed between the bottom threaded segment and the middle segment, the shoulder segment being configured to be secured to a surface of the synchronizing ring; and a top threaded segment having a shape and configuration adapted to receive a threaded retaining device configured to rigidly attach the bearing to the attachment stud, wherein the bottom threaded segment, the middle segment, the shoulder segment and the top threaded segment are coaxially aligned along a central axis of the attachment stud.

15. The attachment system of claim 14, wherein the bottom threaded segment is configured to be recessed relative to a radially inner surface of the synchronizing ring.

16. The attachment system of claim 14, wherein the shoulder segment is configured such that a gap is defined between the synchronizing ring and the lever arm.

17. The attachment system of claim 16, wherein the gap permits the lever arm to twist along its longitudinal axis without contacting the synchronizing ring.

18. The attachment system of claim 14, wherein the shoulder segment is configured to be welded to the synchronizing ring, the shoulder segment defining at least one planar edge for welding the shoulder segment to the surface of the synchronizing ring.

19. The attachment system of claim 14, wherein the bearing comprises an inner component and an outer component configured to rotate relative to the inner component, the shoulder segment extending outwardly from the central axis further than the middle segment such that the inner component is positioned against a face of the shoulder segment when the threaded retaining device is secured to the top segment.

20. The attachment system of claim 14, further comprising a first fillet and a second fillet, the first fillet being defined in the attachment stud between the top threaded segment and the middle segment and being configured to allow the threaded retaining device to be secured against the bearing, the second fillet being defined in the attachment stud between the middle segment and the shoulder segment and being configured to allow the bearing to be positioned against a face of the shoulder segment.

* * * * *